(12) United States Patent
Casady et al.

(10) Patent No.: US 9,842,071 B2
(45) Date of Patent: Dec. 12, 2017

(54) MULTI-CHANNEL I²S TRANSMIT CONTROL SYSTEM AND METHOD

(71) Applicant: Microchip Technology Incorporated, Chandler, AZ (US)

(72) Inventors: James Casady, Queen Creek, AZ (US); Rodney Pesavento, Chandler, AZ (US); Sergey Pavlov, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 413 days.

(21) Appl. No.: 14/538,133

(22) Filed: Nov. 11, 2014

(65) Prior Publication Data
US 2016/0132440 A1    May 12, 2016

(51) Int. Cl.
*G06F 13/16*    (2006.01)
*G06F 13/42*    (2006.01)
*G06F 13/38*    (2006.01)

(52) U.S. Cl.
CPC ........ *G06F 13/1673* (2013.01); *G06F 13/385* (2013.01); *G06F 13/4282* (2013.01); *G06F 13/4291* (2013.01)

(58) Field of Classification Search
CPC ............... G06F 13/1673; G06F 13/385; G06F 13/4282; G06F 13/4291
See application file for complete search history.

(56) References Cited

U.S. PATENT DOCUMENTS

| 5,517,627 A * | 5/1996 | Petersen ................... G06F 5/00 710/316 |
| 2004/0161040 A1* | 8/2004 | Schreiber ................ G06F 3/162 375/242 |
| 2007/0113024 A1* | 5/2007 | Hirano .................. G06F 13/161 711/150 |
| 2008/0244120 A1 | 10/2008 | Park ................................ 710/65 |
| 2011/0078342 A1* | 3/2011 | Siddabathuni .......... G06F 13/28 710/22 |
| 2013/0223259 A1* | 8/2013 | Pratt, Jr. ............. H04L 12/2697 370/252 |

OTHER PUBLICATIONS

Burns, Michael, "Interfacing an I2S Devise to an MSP430 Device," Texas Instruments, URL: http://www.ti.com/lit/an/slaa449a/slaa449a.podf, 7 pages, Mar. 31, 2010.

(Continued)

*Primary Examiner* — Eric Oberly
(74) *Attorney, Agent, or Firm* — Slayden Grubert Beard PLLC (57) ABSTRACT

A serial peripheral interface is configurable to operate in a I²S transmission mode. The interface has a transmission unit connected with external pins for data, bit clock, and left/right clock signal, a first-in-first-out (FIFO) buffer with a plurality of memory lines, and a control unit operable to read data portions from two memory lines, to assemble them into a transmission word, and to forward the assembled transmission word to the transmission unit, wherein the transmission unit is configured to serially transmit the assembled transmission word through the external data pin.

36 Claims, 10 Drawing Sheets

(56) References Cited

OTHER PUBLICATIONS

"TMS320C5515/14/05/04 DSP Inter-IC Sound (I2S) Bus User's Guide," Texas Instruments, URL: http://www.ti.com/1it/ug/sprufx4b/sprufx4b.pclf, 38 pages, May 31, 2014.
International Search Report and Written Opinion, Application No. PCT/US2015/059661, 12 pages, Feb. 3, 2016.

* cited by examiner

MULTI-CHANNEL I²S TRANSMIT CONTROL SYSTEM AND METHOD

TECHNICAL FIELD

The present disclosure relates to a synchronous serial bus, in particular of the I²S type.

BACKGROUND

Various synchronous serial protocols exist in which clock and data are transmitted on separate lines. One of the most common implementations of a synchronous serial interface is the serial peripheral interface (SPI) bus which comprises separate data lines for input and output, a clock line, optionally a select line and/or a slave select line.

The I²S bus uses a similar number of lines, but provides for a different transmission protocol. Microcontrollers often implement the SPI protocol to be enhanced so that the SPI interface can emulate an I2S interface. The I2S protocol uses a bit clock signal BCLK on the clock line and a separate word clock line. The word clock is often referred to as a left/right clock signal LRCLK. Generally, with each edge of the LRCLK a left or right channel data word is serially transmitted using the bit clock signal. The I2S protocol is optimized for audio data. Depending on the configuration, the audio data word having 16, 24, or 32 bits is transferred between devices. In particular, the 24 bit mode is often emulated by using 32 bits or requires some data processing to be implemented correctly.

There exists a need for an improved implementation of an I²S interface, in particular in a microcontroller.

SUMMARY

According to an embodiment, a serial peripheral interface is configurable to operate in a I2S transmission mode and may comprise a transmission unit connected with external pins for data, bit clock, and left/right clock signal, a first-in-first-out (FIFO) buffer comprising a plurality of memory lines and a control unit operable to read data portions from two memory lines, to assemble them into a transmission word, and to forward the assembled transmission word to the transmission unit, wherein the transmission unit is configured to serially transmit the assembled transmission word through the external data pin.

According to a further embodiment, the FIFO buffer may comprise three 32-bit memory lines. According to a further embodiment, in a 24-bit operating mode the control unit is configured to access the first memory line to read bits the upper 24 bits and to transfer them to the transmission unit, then to access the first memory line to read the lower 8 bits and the second memory line to read the upper 16 bits and to transfer a combined 24 bit word to the transmission unit, then to access the second memory line to read the lower 16 bits and the third memory line to read the upper 8 bits and to transfer a combined 24 bit word to the transmission unit, and then to access the third memory line to read the lower 24 bits and to transfer them to the transmission unit. According to a further embodiment, in a 16-bit operating mode the control unit is configured to access the first memory line to read bits the upper 16 bits and to transfer them to the transmission unit, then to access the first memory line to read the lower 16 bits to transfer them to the transmission unit, then to repeat the access and transfer for the second and third memory line.

According to another embodiment, a serial peripheral interface is configurable to operate in a I2S transmission mode and may comprise a plurality of transmission units each connected with at least an external data pin; associated first-in-first-out (FIFO) buffers each comprising a plurality of memory lines; and a control unit operable to read data portions from two memory lines, to assemble them into a transmission word, and to forward the assembled transmission word to the transmission unit, wherein the transmission unit is configured to serially transmit the assembled transmission word through the external data pin.

According to a further embodiment, each FIFO buffer comprises three 32-bit memory lines. According to a further embodiment, one of the transmission units may be configured as a master unit and the remaining transmission units are configured as slave units. According to a further embodiment, input operations are performed on all FIFO buffers such that a write operations writes data to the same address in each FIFO buffer. According to a further embodiment, each transmission unit reads a single data word from an associated FIFO buffer, wherein the address of the single data word is defined in an associated control register. According to a further embodiment, in a 24-bit operating mode, a first transmission unit reads the upper 24 bits of a first memory line, a second transmission unit read the lower 8 bits of the first memory line and the upper 16 bits of the second memory, the third transmission unit reads the lower 16 bits of the second memory line and the upper 8 bits of the third memory line, and the fourth transmission unit reads the lower 24 bits of the third memory line of an associated FIFO buffer, respectively. According to a further embodiment, in a 16-bit operating mode, a first transmission unit reads the upper 16 bits of each memory line and a second transmission unit read the lower 16 bits of each memory line, respectively. According to a further embodiment, in the 16-bit operating mode, the FIFO buffers only uses a single 32 bit memory line. According to a further embodiment, only one of the FIFO buffers is used for all four transmission units. According to a further embodiment, in the 24-bit operating mode, the control unit is configured to access the first memory line of a selected FIFO buffer to read the upper 24 bits and to transfer them to the first transmission unit, then to access the first memory line of the selected FIFO buffer to read the lower 8 bits and the second memory line to read the upper 16 bits and to transfer a combined 24 bit word to the second transmission unit, then to access the second memory line of the selected FIFO buffer to read the lower 16 bits and the third memory line to read the upper 8 bits and to transfer a combined 24 bit word to the third transmission unit, and then to access the third memory line of the selected FIFO buffer to read the lower 24 bits and to transfer them to the fourth transmission unit. According to a further embodiment, in a 16-bit operating mode, the control unit is configured to access each memory line of a selected FIFO buffer to read the upper 16 bits and to transfer them to the first transmission unit, and then to access each memory line of the selected FIFO buffer to read the lower 16 bits and to transfer them to the second transmission unit. According to a further embodiment, in the 16-bit operating mode, the FIFO buffer only uses a single 32 bit memory line.

According to yet another embodiment, a method of operating a serial peripheral interface configurable to operate in a I2S transmission mode, may comprise the steps: configuring the serial peripheral interface to operate in I2S mode, wherein the serial peripheral interface comprises a transmission unit connected with external pins for data, bit clock, and left/right clock signal; providing a first-in-first-out (FIFO)

buffer comprising a plurality of memory lines; and controlling the serial peripheral interface to read data portions from two memory lines, to assemble them into a transmission word, to forward the assembled transmission word to the transmission unit, and serially transmitting the assembled transmission word through the external data pin.

According to a further embodiment of the method, the FIFO buffer may comprise three 32-bit memory lines. According to a further embodiment of the method, in a 24-bit operating mode the method comprises: accessing the first memory line to read bits the upper 24 bits and transferring them to the transmission unit, then accessing the first memory line to read the lower 8 bits and the second memory line to read the upper 16 bits and transferring a combined 24 bit word to the transmission unit, then accessing the second memory line to read the lower 16 bits and the third memory line to read the upper 8 bits and transferring a combined 24 bit word to the transmission unit, and then accessing the third memory line to read the lower 24 bits and transferring them to the transmission unit. According to a further embodiment of the method, in a 16-bit operating mode the method comprises: accessing the first memory line to read bits the upper 16 bits and transferring them to the transmission unit, then accessing the first memory line to read the lower 16 bits transferring them to the transmission unit, then repeating the steps of accessing and transferring for the second and third memory line.

According to yet another embodiment, a method for operating a serial peripheral interface configurable to operate in a I2S transmission mode, may comprise the steps: providing a plurality of transmission units each connected with at least an external data pin; providing associated first-in-first-out (FIFO) buffers each comprising a plurality of memory lines; and reading data portions from two memory lines, assembling them into a transmission word, forwarding the assembled transmission word to the transmission unit, and serially transmitting the assembled transmission word through the external data pin.

According to a further embodiment of the method, each FIFO buffer may comprise three 32-bit memory lines. According to a further embodiment of the method, the method may comprise the step of configuring one of the transmission units as a master unit and the remaining transmission units as slave units. According to a further embodiment of the method, the method may comprise performing input operations on all FIFO buffers such that a write operations writes data to the same address in each FIFO buffer. According to a further embodiment of the method, each transmission unit may read a single data word from an associated FIFO buffer, wherein the address of the single data word is defined in an associated control register. According to a further embodiment of the method, in a 24-bit operating mode, a first transmission unit reads the upper 24 bits of a first memory line, a second transmission unit read the lower 8 bits of the first memory line and the upper 16 bits of the second memory, the third transmission unit reads the lower 16 bits of the second memory line and the upper 8 bits of the third memory line, and the fourth transmission unit reads the lower 24 bits of the third memory line of an associated FIFO buffer, respectively. According to a further embodiment of the method, in a 16-bit operating mode, a first transmission unit reads the upper 16 bits of each memory line and a second transmission unit read the lower 16 bits of each memory line, respectively. According to a further embodiment of the method, in the 16-bit operating mode, the FIFO buffers only uses a single 32 bit memory line. According to a further embodiment of the method, only one of the FIFO buffers is used for all four transmission units. According to a further embodiment of the method, in a 24-bit operating mode, the method comprises: accessing the first memory line of a selected FIFO buffer to read the upper 24 bits and transferring them to the first transmission unit, then accessing the first memory line of the selected FIFO buffer to read the lower 8 bits and the second memory line to read the upper 16 bits and transferring a combined 24 bit word to the second transmission unit, then accessing the second memory line of the selected FIFO buffer to read the lower 16 bits and the third memory line to read the upper 8 bits and transferring a combined 24 bit word to the third transmission unit, and then accessing the third memory line of the selected FIFO buffer to read the lower 24 bits and transferring them to the fourth transmission unit. According to a further embodiment of the method, in a 16-bit operating mode, the method comprises: accessing each memory line of a selected FIFO buffer to read the upper 16 bits and transferring them to the first transmission unit, and then accessing each memory line of the selected FIFO buffer to read the lower 16 bits and transferring them to the second transmission unit. According to a further embodiment of the method, in the 16-bit operating mode, the FIFO buffer only uses a single 32 bit memory line.

DETAILED DESCRIPTION

Figure 1:
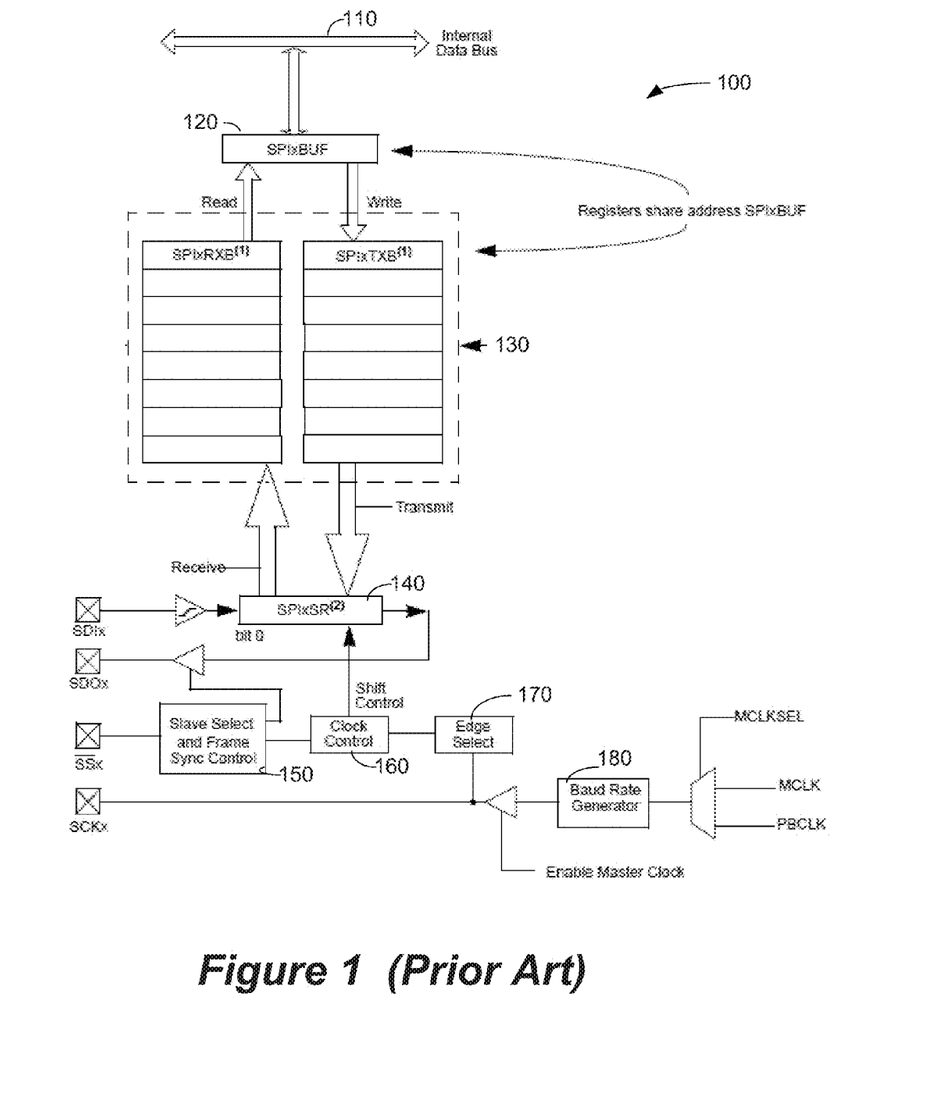
FIG. 1 shows a conventional serial peripheral interface.

FIG. 1 shows a conventional SPI interface peripheral device 100 that may be implemented within a microcontroller. Data to be transferred by the device externally is written into the buffer register 120 via an internal bus 110. The buffer register may be implemented as a first-in-first-out (FIFO) memory 130 with separate transmit and receipt buffers as shown in FIG. 1 and may have any suitable size. According to some embodiments, the FIFO functionality of the buffer may be programmable to be enabled or disabled. The input buffer 120/130 is coupled with a transfer shift register 140 which is connected with external input pins SDIx and external output pin SDOx. The 'x' indicates that multiple units may be present in the microcontroller.

Slave select and frame synchronization control unit 150 is provided and coupled with external slave select pin SSx and may control a tri-state buffer between the output of register 140 and output pin SDOx. A clock control unit 160 provides the shift clock signal which operates shift register 140. Clock control unit 160 is also coupled with slave select and frame synchronization control unit 150 and an edge select unit 170. A baud rate generator 180 can be driven programmably by various internal clock signals and is coupled via a controllable driver with external pin SCKx and edge select unit 170. Various control registers may be implemented that can be used to configure the SPI.

This SPI peripheral 100 is designed to operate as a normal SPI interface with various operating modes, such as master or slave mode, framed operation, DSP mode etc. In addition, this peripheral can be configured to operate as an I²S interface. In this mode, the SSx pin is used as the LRCLK pin, the SCKx operates as the BCLK line and the SDIx and SDOx operate as the data signal input/output pins. Depending on whether the unit 100 is operated as master or slave, pins SSx and SCKx are either output (master) or input (slave) pins.

Once a data word is written into the buffer, the peripheral will transfer the written data via the shift register to output pin SDOx. If the unit is configured as a master device, then the respective clock signals are generated by the device 100. When operating as a slave, the device 100 fetches a new data word from the buffer upon receipt of the respective LRCLK signal. The device is programmable to transfer data words with 16, 24 or 32 bits, wherein the FIFO is designed to have a plurality of 32 bit registers. When programmed to transmit 16 bits words, only the lower 16 bits in each buffer register are transmitted and the upper 16 bits will be ignored. When programmed to transmit 24 bits words, only the lower 24 bits in each buffer register are transmitted and the upper 8 bits will be ignored. When programmed to transmit 32 bits words, each entire buffer register is transmitted. Thus, this implementation requires some pre-processing of the data as audio data is generally stored in mass storage device in a packed manner. Thus, only the 32-bit transfer mode requires no pre-processing as the data can be directly written from memory into the buffer.

However, in 16 bit and 24 bit mode, the respective audio data is stored in a packed fashion, in other words, no alignment of the 24 bits takes place to save memory. If data would be written directly into the buffer 120/130 using 32 bit write operations, the data would be misaligned and truncated. In fact no usable transmission could take place. Thus, the data must be pre-processed before it can be written into the buffer. In particular for 24-bit audio data, this causes time intensive processing. If 32 bit read operations are used to retrieve the data from memory, then 8 or 16 bits must be buffered and combined with a following read. Alternatively, only 8 bit reads could be used and the 24 bits would be assembled by using three consecutive read operations. In any way, the transfer of 24 bit audio data from memory would require some processing which uses up processing power that could be required for other tasks. Similar operations are required for 16 bit audio data even though less processing power is needed due to the alignment of all 16 bit data. However, each 16 bit word must be separately stored in a 32 bit buffer register 120/130 to ensure proper operation of the I²S interface.

Figure 2:
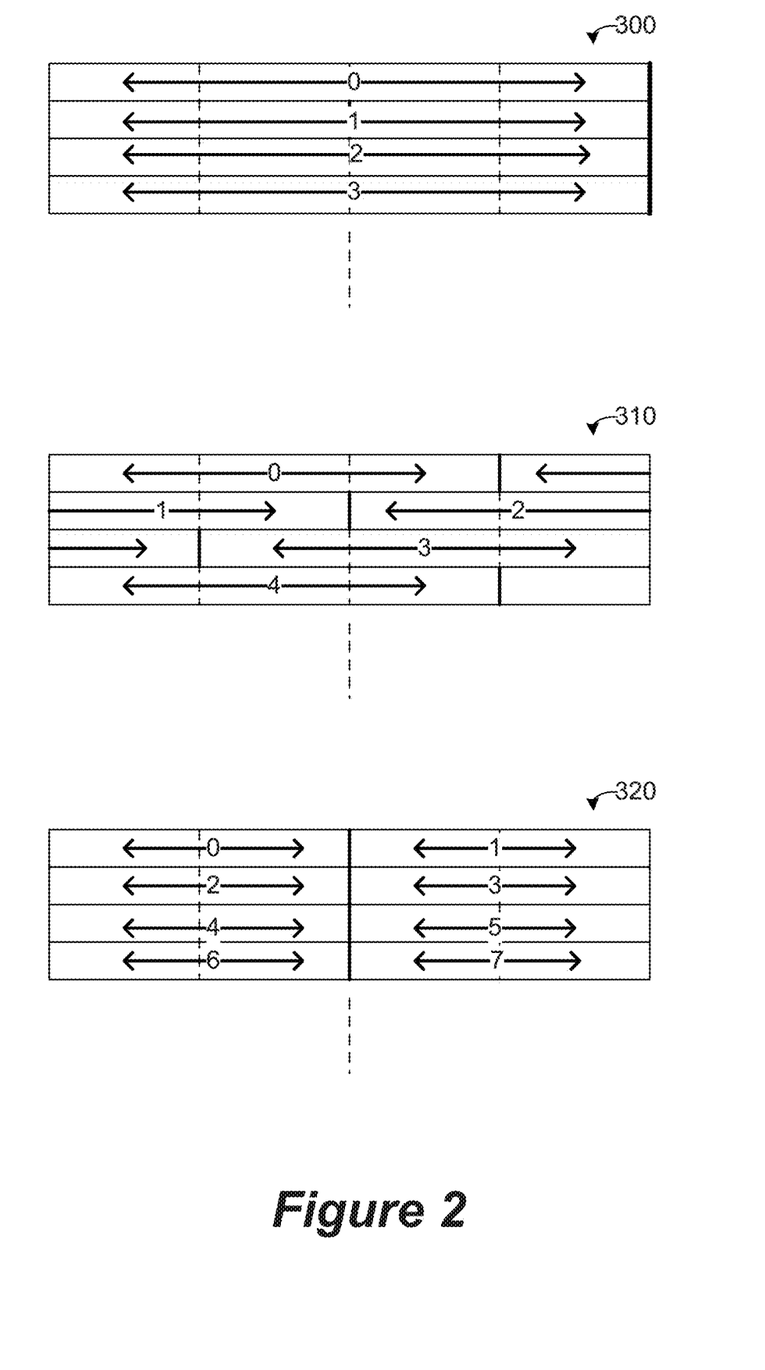
FIG. 2 shows FIFO buffers according to various operating modes of various embodiments.

FIG. 2 shows the alignment of 32 bit, 24 bit, and 16 bit packed data in memory. The data is stored in the most efficient way such that no memory space is wasted. Hence, Each subsequent data word immediately follows the preceding word without any memory space disregarding any type of alignment misplacement. This is generally not an issue for 32 bit words in a 32 bit system because 32 bit data will be automatically aligned if the first word is aligned as shown in example 300. Thus, reading the memory with 32 bit instructions allows placing the respective word into the FIFO with a single write command.

Figure 3:
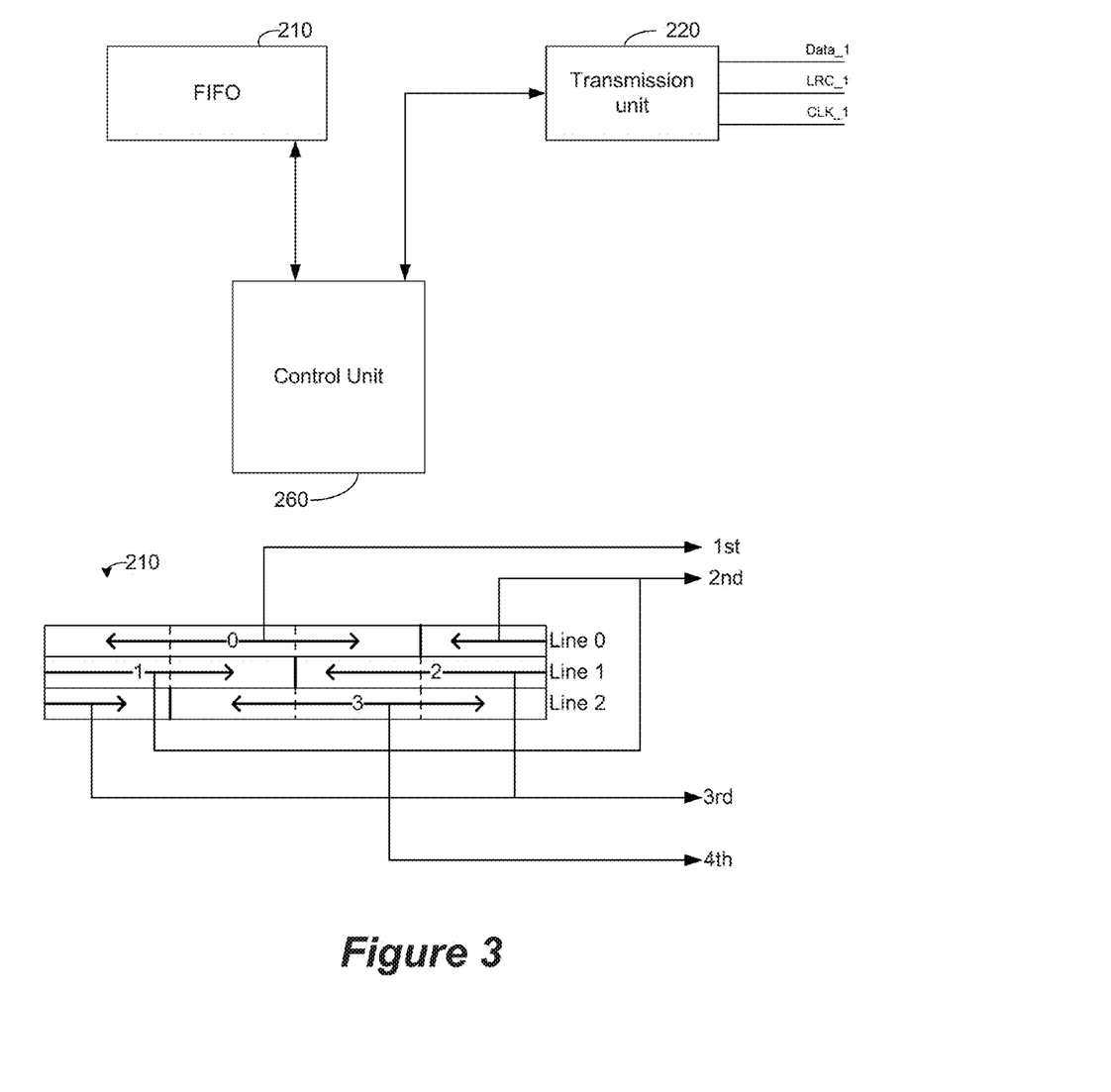
FIG. 3 shows a block diagram of an embodiment.

Example 310 shows the storage of 24 bit data. As can be seen in FIG. 3, only data 0 and 4 are aligned with respect to 32 bit. Thus, either several 8-bit read operations and merging of the data, combined 16-bit and 8-bit read instructions, or 32-bit read instructions and intermediate storage of those parts that are needed for the next 24-bit word are necessary to fill the FIFO correctly.

For 16 bit data width as shown in the example 320, every other word will be aligned to a 32 bit boundary. Thus, either single 16-bit read instructions or a 32-bit read instruction with intermediate buffering are required.

Obviously, the 24-bit scenario as shown in example 310 causes the most processing. FIG. 3 shows an enhanced SPI interface with I²S transmission capability. Here, a FIFO 210 is not connected directly to a SPI transmission unit 220 but rather the access to the FIFO 210 is controlled by a control unit 260 which, for example may include a finite state machine (FSM) that provides the data to the transmission unit 220 depending on a programmable operating mode.

When this unit is programmed to operate in I²S mode, the transmission unit 220 uses its external connections as shown in FIG. 3, namely, the data line is used for audio data, the clock line provides the bit clock signal BCLK, and the SSx pin is used for the LRCLK signal. The bottom of FIG. 3 assumes that the SPI interface operates in the 24-bit audio mode using the I2S protocol. The FIFO 210 will thus be filled directly from memory with 4 audio 24-bit data words. Once the FIFO 210 has been filled with three 32-bit words, the control unit can access the FIFO 210 as shown in the bottom of FIG. 3. A first access the FSM transfers Line0[31 . . . 8] to transmission unit 220. A second access transfers Line0[7 . . . 0] concatenated with Line1[31 . . . 16]. A third access transfers Line1[15 . . . 0] concatenated with Line2[31 . . . 24] and a fourth access transfers Line2[23 . . . 0]. The system then indicates to the microprocessor that the FIFO is empty and more data can be transferred from memory into the buffer. The microprocessor can then transfer directly the next three 32-bit words from memory into the buffer without any processing or rearranging of the data.

In 16-bit operating mode, the state machine 260 accesses the FIFO 210 to alternately read the upper word Linex[31 . . . 16] and the lower word Linex[15 . . . 0]. Again, the processor can transfer data directly using only 32-bit read/write instructions for optimum speed without the necessity to realign the data retrieved from memory. According to another embodiment, in the 16-bit operating mode, the FIFO 210 may only use a single memory line.

Figure 4:
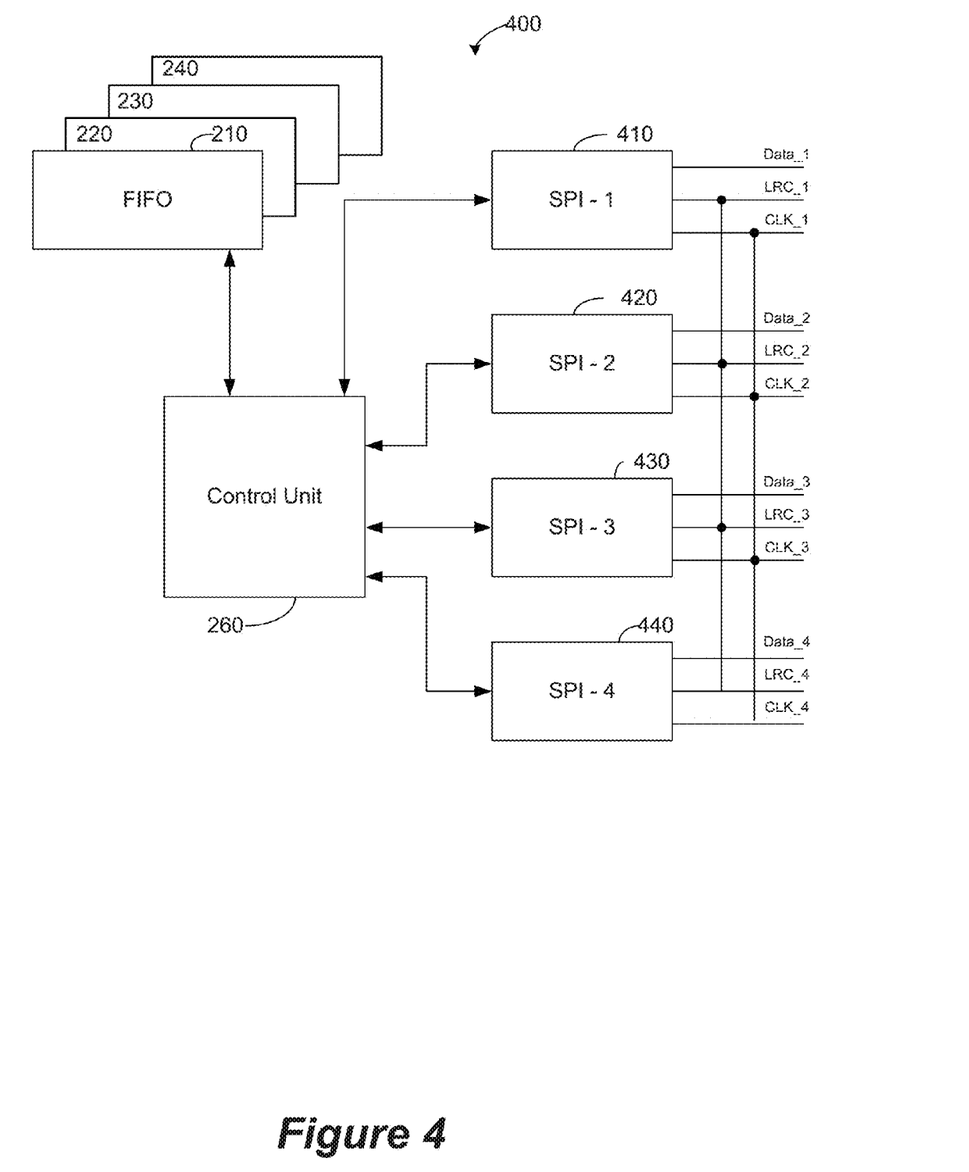
FIG. 4 shows a block diagram of another embodiment.

FIG. 4 shows yet another embodiment of a synchronous serial interface peripheral 400, in which multiple SPI or I²S interface units 410, 420, 230, 240 operate with a FIFOs 210-240 to provide for a multi-channel functionality. In this example four channels are provided. However, according to other embodiments, more or less channels may be provided. In such implementations the number of FIFO lines for each FIFO 210-240 may be increased accordingly such that a block of audio data that is transferred is aligned with respect to a 32 bit memory structure. Due to the fact that 24-bit data words are aligned for every four words in a 32-bit memory system, multiples of four channels may have to be considered in a 32-bit system. However, the concept discussed above may also be used in 16-bit system which would require 3 16-bit FIFO lines storing 2 two 24-bit words at a minimum or multiples thereof for more channels. Higher bit systems would be able to store more 24-bit words in three FIFO lines.

Again, a control unit 260 may be used to configure these four channel units and may comprise a finite state machine (FSM) that coordinates the transfer of data stored in the buffer FIFOs 210-240. Each unit comprises separate data, LRCD and CLK lines. One unit may be selected as a master, for example unit 440 and the remaining units 410-430 may operate as slave devices. Which unit is master may be selectable or may be fixed according to respective implementations. As shown in FIG. 4, the respective clock lines of these units are connected with each other such that the master unit 440 provides the clock signals to units 410-420. Hence, all transmissions of audio signals over the four channels occurs synchronously.

Externally, the device may provide only one set of LRC and CLK pins and respective associated pins of the slave SPI units 410-430 may be available for other purposes, such as general purpose input/output pin functionality. Hence, when the device operates in the various modes shown in FIGS. 4-6 a plurality of external pins may be available for other functions.

According to various embodiments, the control unit 260 can be configured to allow packed data to be directly transferred from a single buffer FIFO, for example FIFO 240, or from each buffer FIFO 210-240 associated with the respective transmission unit 410-440. The controller is configured to read the buffer line by line and coordinate the transfer/assembly of the stored data to the correct I²S unit 410-440 in a similar fashion as explained with respect to FIG. 3. In one embodiment, in the 24-bit operating mode, the four 24 bit words would be distributed to all four channels for synchronous transmission. Because the master 440 triggers the transmission, the master 440 is the last channel that receives its data. Thus, once the data has been transferred to the master 440, the master starts the transmission which sends the respective clock signals to all other units to trigger their transmission simultaneously. This could be done by a separate command or through completion of writing to the FIFO.

Figure 5:
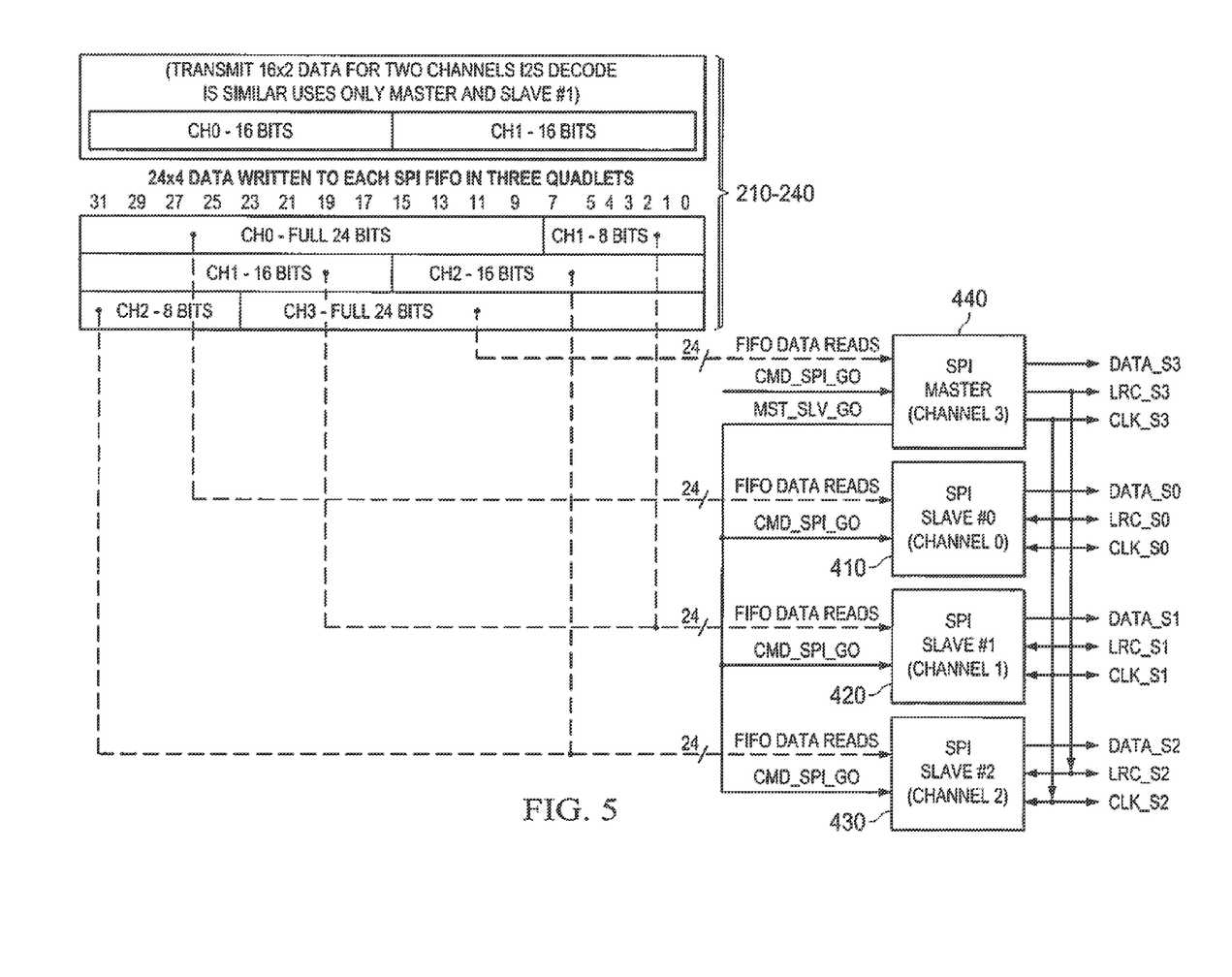
FIGS. 5 and 6 show operating modes of an embodiment according to FIG. 4.

FIG. 5 shows the same configuration as FIG. 4 in more detail when the system is configured in the I²S mode with 24-bit audio data. The SPI Master controller 240 and up to 3 SPI slaves 210-230 are provided for decoding and transmitting data in a packed 32-bit format of 3 quadlets for 4 channels 24-bit data or 1 quadlet for 2 channels 16-bit data. When the FIFO data is read, the Master and slave combinations transmit decoded data for all 4 (Or 2) channels at the same time, with the Master CLK and LRC (sync pulse) as discussed above. As mentioned above, according some embodiments, in the 16-bit operating mode, the FIFOs 210-240 may only use a single memory line as indicated with the top representation of FIFOs 210-240 in FIG. 5.

As shown, the system may operate with "one write to many FIFOs" in one embodiment, wherein data in the form of 3 or 1 (32-bit) quadlets are written to all spy FIFOs 210-240. According to this embodiment, this is done with one write cycle in which all FIFO's would be addressed at the same time, each getting the same data values, but could be done with separate writes to FIFOs 210-240 which obviously would require more processing time. According to some embodiments, the user can define which SPI unit 210-240 gets which Bits of data from each quadlet in the FIFO with a user settable SPI register value. Only one SPI is defined as a Master and the remaining SPI's are defined as slaves. Table 1 shows the possible settings for unit 210-250.

TABLE 1

SLAVE_EN[2:0]

000 -- Master decode enable
001 -- Slave 1 decode enable
010 -- Slave 2 decode enable
011 -- Slave 3 decode enable
100 -- Master 16-bit decode [15:0] enable TABLE 1-continued

SLAVE_EN[2:0]

101 -- Master 16-bit decode [31:16]enable
110 -- Slave 1 16-bit decode [31:16] enable
111 -- Slave 1 16-bit decode [15:0] enable A finite state machine (FSM) for data decode from the FIFO is the same for Master or Slave. The FSM controls reading FIFO data along with user defined SPI register values determines which bits of data from the quadlet is supposed to be shift out of the SPI. The Master/Slave SPI is commanded to start sending the data either by a signal from the CPU or in auto Mastermode when the Master SPI FSM commands to send the data out.

Figure 6:
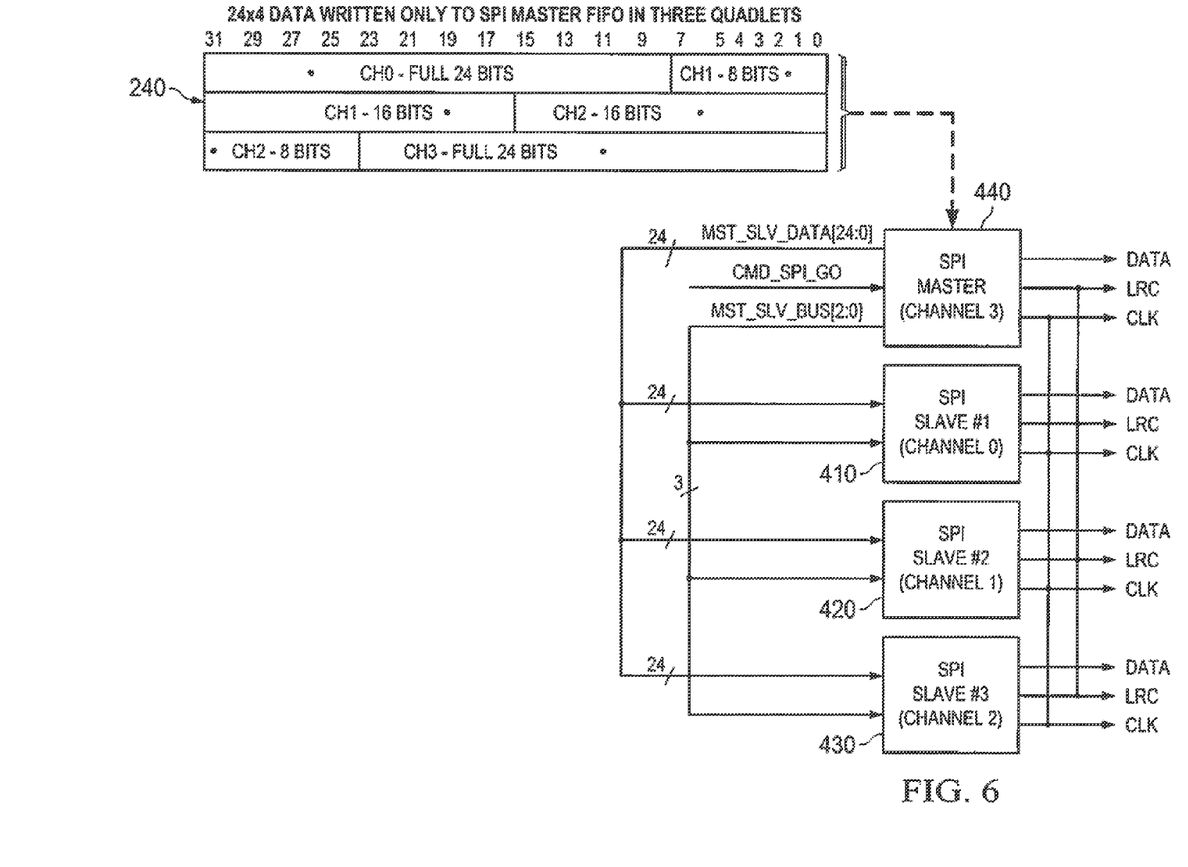

According to another embodiment "Master only FIFO write with a side band bus" can be implemented as shown in FIG. 6. In this embodiment, data in the form of 3 or 1 (32-bit) quadlets is written only to the Master FIFO, for example, FIFO 240. The user has defined which Slave SPI gets which Bits of data from each quadlet in the FIFO 240 with a user settable SPI register value. Only one SPI is defined as a Master and the remaining SPI's are defined as slaves. The FSM for data decode from the FIFO 240 is the same for Master or Slave, but only enabled in the SLAVE. The FSM controls reading FIFO data along with user defined SPI register values determines which bits of data from the quadlet is supposed to be shift out of the SPI. The Master/Slave SPI is commanded to start sending the data either by a signal CMD_SPI_GO from the CPU or in auto Mastermode when the Master SPI FSM commands to send the data out. A data bus MST_SLV_DATA[24:0] connects to all SPI units for transmission of data. A second bus MST_SLV_BUS[2:0] provides control values according to table 2. As shown in FIG. 6, the data and control signals can be channeled through the SPI master unit 440. However, other embodiments may provide these signals by the control unit 260. As mentioned above, according some embodiments, in the 16-bit operating mode, the FIFO 210 may only use a single memory line.

TABLE 2

MST_SLV_BUS[2:0]

000 -- nothing default
1xx -- Master start transmit slave
x01 -- SPI slave#1 get data
x10 -- SPI slave#2 get data
x11 -- SPI slave#3 get data All functionalities as described above may be combined as appropriate. For example, a device may be designed to operate in a first and a second operating mode as shown in FIGS. 5 and 6. The FIFOs may be designed to have a programmable size of for example more than three memory lines. Thus, other operating modes, e.g. using 32-bit wide audio data with one or more channels may benefit from a larger FIFO size.

Figure 7:
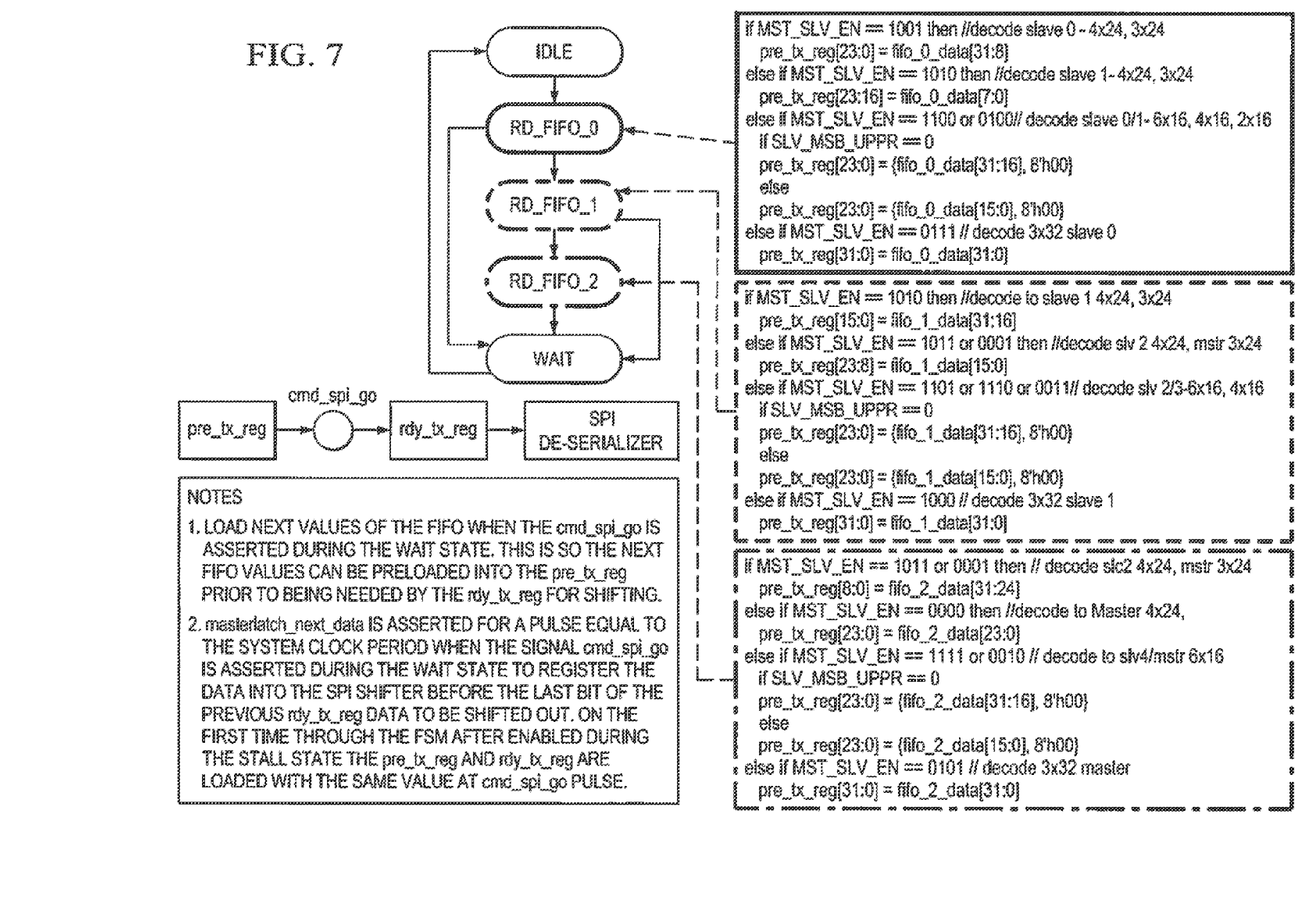
FIGS. 7-10 show flow charts of operating modes according to various embodiments.

FIG. 7 shows a general flow chart including three consecutive read operations for the 24-bit operating mode which feeds four channels and a single read operation in the 16-bit operating mode which feeds two channels according to various embodiments. Note: The next values of the FIFO can be loaded when a respective signal cmd_spi_go is asserted during the wait state. This is so the next FIFO value can be preloaded into the transmit register. The master_latch_next_data signal is asserted for a pulse equal to the system clock period when the signal cmd_spi_go is asserted during the wait state to register the data into the SPI shifter before the last bit of the previous rdy_tx_reg_data to be shifted out. On the first time through the FSM after enabled during the stall state the pre_tx_reg and rdy_tx_reg are loaded with the same value at cmd_spi_go pulse.

Figure 8:
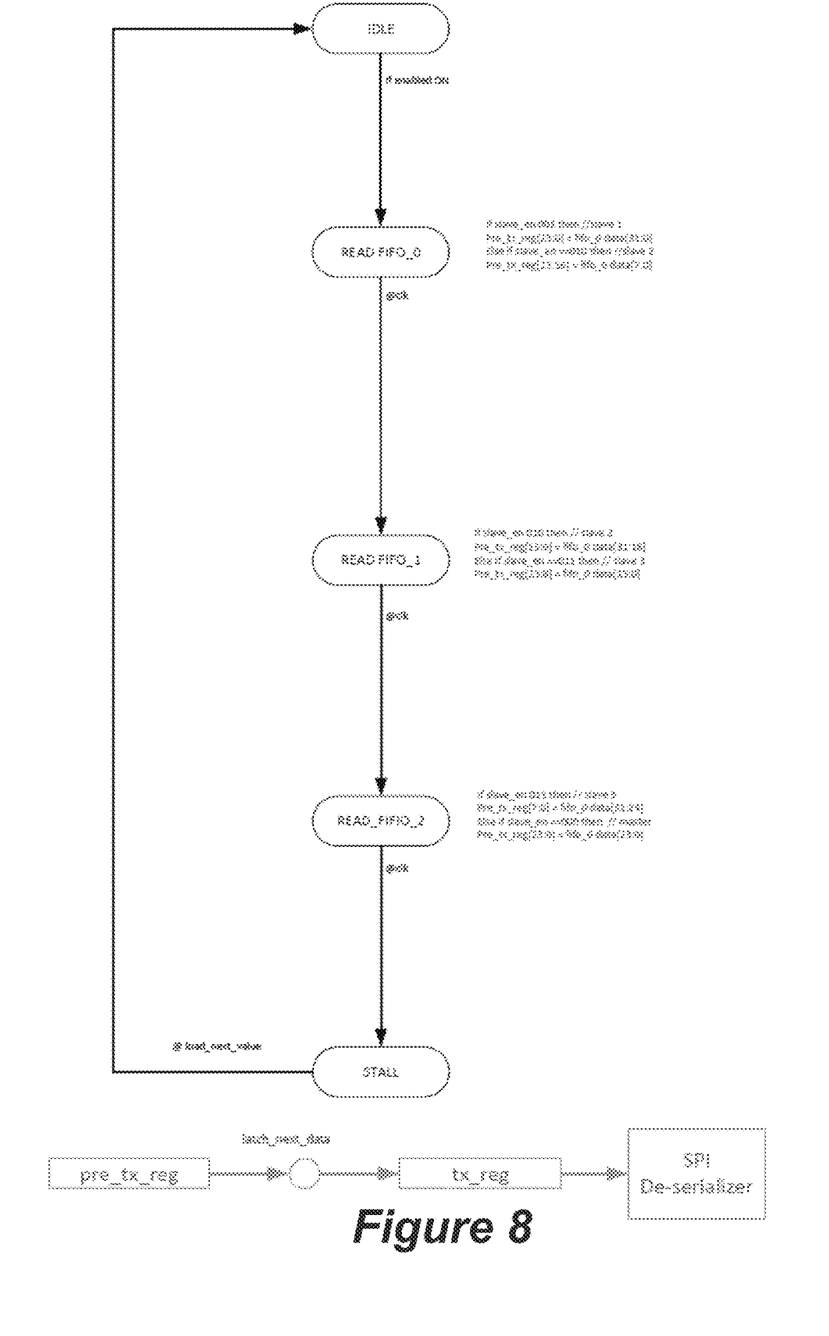
Figure 10:
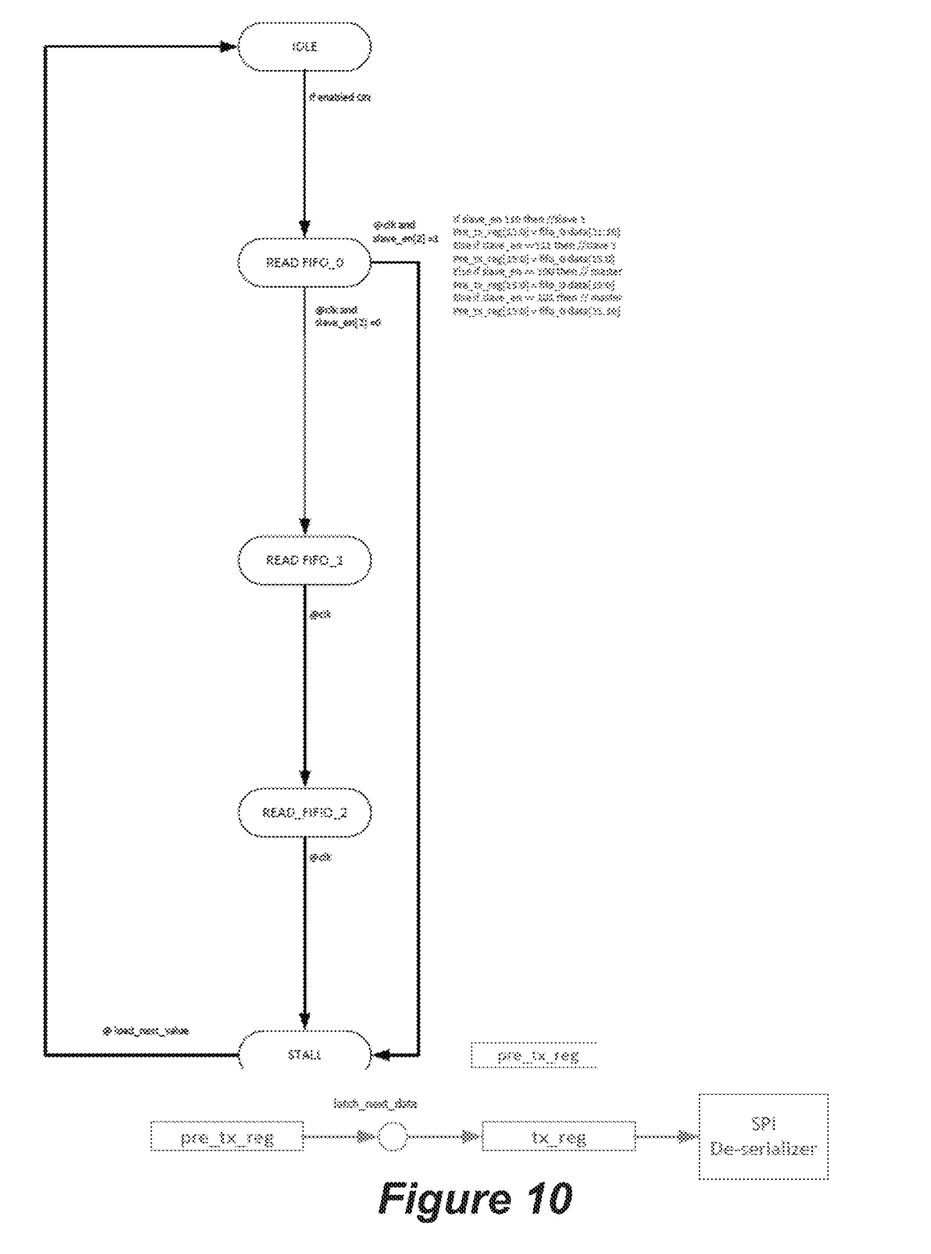

FIG. 8 shows a flow chart for the 24-bit operating mode according to an embodiment. FIG. 10 shows a flow chart for the 16-bit operating mode with a single memory line in the FIFO being operative according to an embodiment. Note: The load_next_value is asserted for a pulse equal to the system clock at the start of the shift of the tx_reg. So the next fifo values can be preloaded into the pre_tx_reg prior to be being needed for shifting in the tx_reg. The mst_latch_next_data is asserted for a pulse equal to the system clock when the go signal from the cpu is high or in auto-mode during state stall and before the SPI shifter has shifted out the last bit of the tx_reg data to be shifted out. On the first time through the state machine after enabled at the stall state the pre_tx_reg and tx_reg are loaded with the same value with the latch_next_data.

Figure 9:
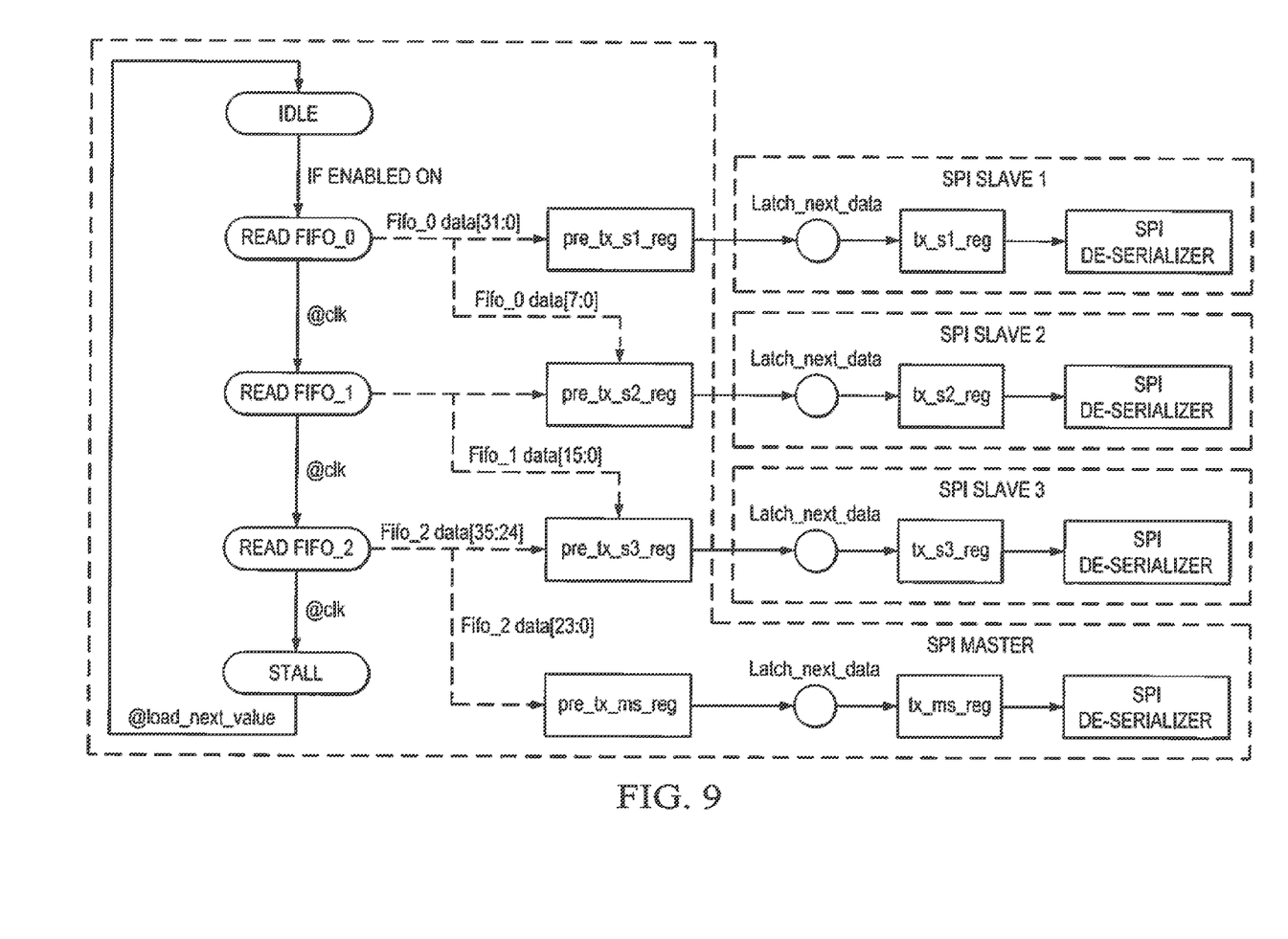

FIG. 9 shows a flow chart for the 24-bit mode with four channels and the respective data assembly paths according to an embodiment. Note: Load_next_value: is asserted for a pulse equal to the system clock at the start of the shift of the master tx_ms_reg. So the next fifo values can be preloaded into the pre_tx_xx_reg prior to be being needed for shifting in the tx_xx_reg. Latch_next_data: is asserted for a pulse equal to the system clock when the go signal from the cpu is high or in automode during state stall and before the SPI master shifter has shifted out the last bit of the tx_ms_reg data to be shifted out. On the first time through the state machine after enabled at the stall state the pre_tx_xx_reg and tx_xx_reg are loaded with the same value with the latch_next_data.

What is claimed is:

1. A serial peripheral interface configurable to operate in a $I^2S$ transmission mode and comprising:
   a transmission unit connected with external pins for data, bit clock, and left/right clock signal;
   a first-in-first-out (FIFO) buffer comprising a plurality of memory lines; wherein the FIFO buffer is configured to fill memory lines with each write operation in a first in first out fashion and to read in at least one read mode with a read operation partial data from a memory line of the FIFO and partial data from a consecutive memory line of the FIFO in a first in first out fashion; and
   a control unit operable to read the FIFO in said at least one read mode and to assemble the partial data from the memory line and the partial data from the consecutive memory line into a transmission word, and to forward the assembled transmission word to the transmission unit, wherein the transmission unit is configured to serially transmit the assembled transmission word through the external data pin.

2. The serial peripheral interface according to claim 1, wherein the FIFO buffer comprises three 32-bit memory lines.

3. The serial peripheral interface according to claim 2, wherein in a 24-bit operating mode the control unit is configured:
   with a first read operation to access a first memory line of the FIFO to read the upper 24 bits of the first memory line and to transfer them to the transmission unit,
   then with a second read operation to access the first memory line to read the lower 8 bits and a second memory line to read the upper 16 bits and to transfer a combined 24 bit word to the transmission unit,
   then with a third read operation to access the second memory line to read the lower 16 bits and a third memory line to read the upper 8 bits and to transfer a combined 24 bit word to the transmission unit, and
   then with a fourth read operation to access the third memory line to read the lower 24 bits and to transfer them to the transmission unit.

4. The serial peripheral interface according to claim 2, wherein in a 16-bit operating mode the control unit is configured:
   with a first read operation to access a first memory line of the FIFO to read the upper 16 bits and to transfer them to the transmission unit,
   then with a second read operation to access the first memory line to read the lower 16 bits to transfer them to the transmission unit,
   then to repeat the access and transfer for the second and third memory line according to a first in first mode of the FIFO.

5. A serial peripheral interface configurable to operate in a $I^2S$ transmission mode and comprising:
   a plurality of transmission units each connected with at least an external data pin;
   a plurality of first-in-first-out (FIFO) buffers, each FIFO buffer being associated with a respective one of the plurality of transmission units, and each FIFO buffer comprising a plurality of memory lines; wherein each FIFO buffer is configured to fill memory lines with each write operation in a first in first out fashion and to read in at least one read mode with a read operation partial data from a memory line of the FIFO and partial data from a consecutive memory line of the FIFO in a first in first out fashion; and
   a control unit operable to read each FIFO in said at least one read mode and to assemble the partial data from the memory line and the partial data from the consecutive memory line into a transmission word, and to forward the assembled transmission word to an associated transmission unit of said plurality of transmission units, wherein the associated transmission unit is configured to serially transmit the assembled transmission word through the external data pin.

6. The serial peripheral interface according to claim 5, wherein each FIFO buffer comprises three 32-bit memory lines.

7. The serial peripheral interface according to claim 6, wherein one of the transmission units is configured as a master unit and the remaining transmission units are configured as slave units.

8. The serial peripheral interface according to claim 7, wherein input operations are performed on all FIFO buffers such that a write operations writes data to the same address in each FIFO buffer.

9. The serial peripheral interface according to claim 8, wherein each transmission unit reads a single data word from an associated FIFO buffer, wherein the address of the single data word is defined in an associated FIFO control register.

10. The serial peripheral interface according to claim 9, wherein in a 24-bit operating mode, a first transmission unit receives the upper 24 bits of a first memory line of its associated FIFO buffer, a second transmission unit receives the lower 8 bits of a first memory line and the upper 16 bits of a second memory line of its associated FIFO buffer, the third transmission unit receives the lower 16 bits of a second memory line and the upper 8 bits of a third memory line of its associated FIFO buffer, and the fourth transmission unit receives the lower 24 bits of a third memory line of its associated FIFO buffer.

11. The serial peripheral interface according to claim 9, wherein in a 16-bit operating mode, a first transmission unit receives the upper 16 bits of a read memory line of its associated FIFO buffer and a second transmission unit receives the lower 16 bits of a read memory line of its associated FIFO buffer.

12. The serial peripheral interface according to claim 11, wherein in the 16-bit operating mode, the FIFO buffers are controlled to only read data from a single 32 bit memory line with each read operation.

13. The serial peripheral interface according to claim 7, wherein four transmission units are provided and only one of the plurality of FIFO buffers is used for all four transmission units.

14. The serial peripheral interface according to claim 13, wherein in a 24-bit operating mode, the control unit is configured:
with a first read operation to access a first memory line of a selected FIFO buffer to read the upper 24 bits and to transfer them to the first transmission unit,
then with a second read operation to access the first memory line of the selected FIFO buffer to read the lower 8 bits and to access a second memory line to read the upper 16 bits and to transfer a combined 24 bit word to the second transmission unit,
then with a third read operation to access the second memory line of the selected FIFO buffer to read the lower 16 bits and to access a third memory line to read the upper 8 bits and to transfer a combined 24 bit word to the third transmission unit, and
then with a fourth read operation to access the third memory line of the selected FIFO buffer to read the lower 24 bits and to transfer them to the fourth transmission unit.

15. The serial peripheral interface according to claim 13, wherein in a 16-bit operating mode, the control unit is configured:
with a first read operation to access a current memory line of a selected FIFO buffer to read the upper 16 bits and to transfer them to the first transmission unit, and
then with a second read operation to access the current memory line of the selected FIFO buffer to read the lower 16 bits and to transfer them to the second transmission unit.

16. The serial peripheral interface according to claim 15, wherein in the 16-bit operating mode, the FIFO buffer is controlled to only read data from a single 32 bit memory line with each read operation.

17. A method of operating a serial peripheral interface configurable to operate in a I'S transmission mode, comprising the steps:
configuring the serial peripheral interface to operate in I'S mode, wherein the serial peripheral interface comprises a transmission unit connected with external pins for data, bit clock, and left/right clock signal;
providing a first-in-first-out (FIFO) buffer comprising a plurality of memory lines;
writing into the FIFO buffer wherein each write operation fills one of the plurality of memory lines in a first in first out fashion; and
controlling the FIFO buffer in at least one read mode to read data portions from two consecutive memory lines with one read operation,
to assemble the data portions into a transmission word,
to forward the assembled transmission word to the transmission unit, and
serially transmitting the assembled transmission word through the external data pin.

18. The method according to claim 17, wherein the FIFO buffer comprises three 32-bit memory lines.

19. The method according to claim 18, wherein in a 24-bit operating mode the method comprises:
with a first read operation accessing a first memory line of the FIFO buffer according to a first in first fashion to read the upper 24 bits and transferring them to the transmission unit,
then with a second read operation accessing the first memory line to read the lower 8 bits and accessing a consecutive the second memory line of the FIFO buffer according to a first in first out fashion to read the upper 16 bits and transferring a combined 24 bit word to the transmission unit,
then with a third read operation accessing the second memory line to read the lower 16 bits and a third memory line according to a first in first out fashion to read the upper 8 bits and transferring a combined 24 bit word to the transmission unit, and
then with a fourth read operation accessing the third memory line to read the lower 24 bits and transferring them to the transmission unit.

20. The method according to claim 18, wherein in a 16-bit operating mode the method comprises:
with a first read operation accessing a first memory line of the FIFO according to a first in first out fashion to read the upper 16 bits of the first memory line and transferring them to the transmission unit,
then with a second read operation accessing the first memory line to read the lower 16 bits of the first memory line transferring them to the transmission unit,
then repeating the steps of accessing and transferring for the second and third memory line according to a first in first out fashion.

21. A method for operating a serial peripheral interface configurable to operate in a I'S transmission mode, comprising the steps:
providing a plurality of transmission units each connected with at least an external data pin;
providing a plurality of first-in-first-out (FIFO) buffers associated with the plurality of transmission units, respectively and each comprising a plurality of memory lines; wherein each FIFO buffer is configured to fill memory lines with each write operation in a first in first out fashion;
and in at least one reading mode selected for one of the FIFO buffers:
reading data portions from two consecutive memory lines of the one of the FIFO buffers with a single read operation,
assembling the data portions into a transmission word,
forwarding the assembled transmission word to the transmission unit, and
serially transmitting the assembled transmission word through the external data pin.

22. The method according to claim 21, wherein each FIFO buffer comprises three 32-bit memory lines.

23. The method according to claim 22, comprising the step of configuring one of the transmission units as a master unit and the remaining transmission units as slave units.

24. The method according to claim 23, comprising performing input operations on all FIFO buffers such that a write operations writes data to the same address in each FIFO buffer according to a first in first out fashion.

25. The method according to claim 24, wherein each transmission unit receives a single data word from an associated FIFO buffer, wherein the address of the single data word is defined in an associated FIFO control register.

26. The method according to claim 25, wherein in a 24-bit operating mode, a first transmission unit receives the upper 24 bits of a first memory line of its associated FIFO buffer, a second transmission unit receives the lower 8 bits of a first memory line and the upper 16 bits of a second memory line of its associated FIFO buffer, the third transmission unit receives the lower 16 bits of a second memory line and the upper 8 bits of a third memory line of its associated FIFO buffer, and the fourth transmission unit receives the lower 24 bits of a third memory line of its associated FIFO buffer.

27. The method according to claim 25, wherein in a 16-bit operating mode, a first transmission unit receives the upper 16 bits of a read memory line of its associated FIFO buffer and a second transmission unit receives the lower 16 bits of a read memory line of its associated FIFO buffer.

28. The method according to claim 25, wherein in the 16-bit operating mode, the FIFO buffers are controlled to only read data from a single 32 bit memory line with each read operation.

29. The method according to claim 23, wherein four transmission units are provided and only one of the plurality of FIFO buffers is used for all four transmission units.

30. The method according to claim 29, wherein in a 24-bit operating mode, the method comprises:
with a first read operation accessing a first memory line of a selected FIFO buffer to read the upper 24 bits and transferring them to the first transmission unit,
then with a second read operation accessing the first memory line of the selected FIFO buffer to read the lower 8 bits and a second memory line to read the upper 16 bits and transferring a combined 24 bit word to the second transmission unit,
then with a third read operation accessing the second memory line of the selected FIFO buffer to read the lower 16 bits and a third memory line to read the upper 8 bits and transferring a combined 24 bit word to the third transmission unit, and
then with a fourth read operation accessing the third memory line of the selected FIFO buffer to read the lower 24 bits and transferring them to the fourth transmission unit.

31. The method according to claim 29, wherein in a 16-bit operating mode, the method comprises:
with a first read operation accessing a current memory line of a selected FIFO buffer according to a first in first out fashion to read the upper 16 bits and transferring them to the first transmission unit, and
then with a second read operation accessing the current memory line of the selected FIFO buffer to read the lower 16 bits and transferring them to the second transmission unit.

32. The method according to claim 31, wherein in the 16-bit operating mode, the FIFO buffer is controlled to only read data from a single 32 bit memory line with each read operation.

33. A serial peripheral interface configurable to operate in a I²S transmission mode and comprising:
a transmission unit connected with external pins for data, bit clock, and left/right clock signal;
a first-in-first-out (FIFO) buffer comprising a plurality of memory lines; wherein the FIFO buffer is configured to fill a memory line with each write operation according to a first in first out fashion and wherein the FIFO buffer is further configured to operate in a first read mode to read an entire FIFO buffer line with each read operation according to a first in first out fashion, in a second mode to read with each read operation partial data from a FIFO buffer line and in a third read mode to read with each read operation partial data from a memory line and partial data from a consecutive memory line; and
a control unit operable to read the FIFO in said first, second and third read mode and to assemble the partial data from the memory line and the partial data from the consecutive memory line into a transmission word, and to forward the assembled transmission word to the transmission unit, wherein the transmission unit is configured to serially transmit the assembled transmission word through the external data pin.

34. The serial peripheral interface according to claim 33, wherein the FIFO buffer comprises three 32-bit memory lines.

35. The serial peripheral interface according to claim 34, wherein in a 24-bit operating mode the control unit is configured:
a first read operation causes the control unit to read the FIFO in the second read mode thereby partially reading the upper 24 bits of a memory line and to transfer them to the transmission unit,
a second read operation causes the control unit to read the FIFO in the third read mode thereby partially reading the lower 8 bits of the memory line and the upper 16 bits of a consecutive memory line of the FIFO and to transfer a combined 24 bit word to the transmission unit,
a third read operation causes the control unit to read the FIFO in the third read mode thereby partially reading the lower 16 bits of the consecutive memory line to read the upper 8 bits of a following consecutive memory line and to transfer a combined 24 bit word to the transmission unit, and
a fourth read operation causes the control unit to read the FIFO in the second mode thereby reading the lower 24 bits of the following consecutive memory line and to transfer them to the transmission unit.

36. The serial peripheral interface according to claim 34, wherein in a 16-bit operating mode the control unit is configured:
with a first read operation to access a first memory line of the FIFO buffer according to a first in first out fashion to read the upper 16 bits and to transfer them to the transmission unit,
then with a second read operation to access the first memory line to read the lower 16 bits to transfer them to the transmission unit,
then to repeat the access and transfer for the second and third memory line according to a first in first out fashion.

* * * * *